United States Patent [19]

Galkin et al.

[11] 4,171,281

[45] Oct. 16, 1979

[54] GRAPHITIZATION AND REDUCING CHARGE

[76] Inventors: Pavel N. Galkin, ulitsa 40 let Sovetskoi Ukrainy, 78, kv. 32; Boris V. Komarov, prospekt Lenina, 159, kv. 45; Leonid P. Khlopkov, ulitsa 40 let Sovetskoi Ukrainy, 24, kv. 11; Eduard V. Gorbatenko, ulitsa 40 let Sovetskoi Ukrainy 62, kv. 125; Boleslav D. Luttsev, bulvar Tsentralny, 3, kv. 10; Nikolai A. Kiprich, ulitsa Rekordnaya, 32, kv. 8; Alexandr A. Rogatkin, ulitsa 40 let Sovetskoi Ukrainy, 7, kv. 3; Grigory I. Silakov, ulitsa Yatsenko, 4a, kv. 59; Nikolai V. Galitsky, prospekt Mayakovskogo, 3a, kv. 13; Arkady G. Sasin, ulitsa Gorkogo, 169, kv. 117; Mark I. Miloslavsky, prospekt Lenina, 190, kv. 50; Stanislav I. Gashenko, ulitsa Gorkogo, 159, kv. 76; Lidia I. Lekalova, ulitsa 40 let Sovetskoi Ukrainy, 58, kv. 39; Mikhail N. Bystrenin, ulitsa Rekordnaya, 4a, kv. 27, all of Zaporozhie, U.S.S.R.

[21] Appl. No.: 875,073

[22] Filed: Feb. 3, 1978

[51] Int. Cl.$^2$ .................. C01B 31/02; C01B 31/04

[52] U.S. Cl. ........................................ 252/188; 13/7; 75/89; 252/62; 264/29.4; 264/29.5; 264/29.7; 423/448

[58] Field of Search ............ 252/188, 62; 13/7; 75/89; 264/29.4, 29.5, 29.7; 423/448; 106/307; 44/10 C

[56] References Cited

U.S. PATENT DOCUMENTS

| | | | |
|---|---|---|---|
| 3,357,929 | 12/1967 | Olstowski | 423/448 |
| 3,619,286 | 11/1971 | Gutnajer | 423/448 |
| 3,914,392 | 10/1975 | Klett | 423/448 |

Primary Examiner—Benjamin R. Padgett
Assistant Examiner—Irwin Gluck
Attorney, Agent, or Firm—J. Harold Nissen

[57] ABSTRACT

A graphitization and reducing charge intended for thermal processing of carbon and graphite products consists of 85 to 95 percent by mass of coke containing not less than 90 percent by volume of size fraction ranging from 0.5 to 2 mm and not more than 10 percent by volume of size fraction ranging from 2 to 10 mm and of 5 to 15 percent by mass of sawdust.

The graphitization charge, after having been subjected to not less than 2000° C. in the graphitization oven, may be used as a reducing agent in ferrous and nonferrous metallurgy. As a reducing agent it possesses greater reactivity than known reducing agents, since its oxidation capacity is 54%.

The use of the aforesaid charge provides a means to economize coke which is a scarce carbon material.

2 Claims, No Drawings

GRAPHITIZATION AND REDUCING CHARGE

BACKGROUND OF THE INVENTION

1. Field of Application

The invention relates to nonferrous metallurgy, in particular to the manufacture of graphitized products such as electrodes for electric steelmaking, slabs for blast and titanium-magnesium production furnaces, anodes for the chemical industry, and to reducing processes in nonferrous and ferrous metallurgy.

2. Description of the Prior Art

There is known a carbonaceous heat insulating charge used for thermal processing of carbon and carbon graphite products in electric resistance furnaces comprising 60% by volume of fine metallurgical coke sized 0 to 10 mm of which 12% by mass is ash, and 3% by mass is, volatiles. In addition, the known charge contains 30% by volume of quartz sand and 10% by volume of sawdust.

A shortcoming of said charge is the presence of quartz sand which forms silicon carbide at a temperature of about 2000° C., chemically reacting with the furnace refractory lining and causing the failure thereof. Silicon carbide also affects adversely the chemical reactivity of the charge and increases its both ash content and heat conductivity.

Furthermore, silicon inhibits pore formation in the charge, this preventing the complete removal of gases from the furnace space which gases increase the ash content in products and thus impair their quality.

There is also known a carbonaceous heat insulating charge comprising 70 to 83 percent by volume of coke sized 0 to 10 mm with 12% by mass of ash and 3 percent by mass of volatiles and 17 to 30 percent by volume of sawdust.

A shortcoming of said charge is such a large proportion of sawdust sharply increases the heat conductivity of the charge due to a substantial formation of pores in course of graphitization. The increase in the charge heat conductivity results in a greater specific consumption of electric power and a consequent reduction in the efficiency of the furnace by 20 to 30 percent. A higher heat conductivity also raises the temperature gradient across the body of items involved and so promotes a greater crack formation, this resulting in a higher amount of discards.

There are also known reducing agents used in nonferrous metallurgy, e.g. in the manufacture of titanium tetrachloride which are formed of cokes such as pitch or various petroleum refinery cokes (e.g. pyrolysis coke, cracking coke, formed coke in slow coking plants), anthracite, gas coal and charcoal.

Any of these reducing agents must comply to general performance requirements, namely high reactivity, low electrical conductivity, and low ash content and cost.

Petroleum and pitch cokes are most efficient reducing agents. These cokes contain substantial amounts of carbon (80 to 90%) and have low ash content. However, they have found no practical application due to both their high cost and high electric resistance ($\rho = 5000$ ohm mm$^2$/m). On the other hand, inexpensive pertroleum coke, obtained in slow coking plants, has found no practical application due to its high volatile (up to 9% by mass) and moisture (up to 12% by mass) content and excessive electric resistance ($\rho = 8000$ ohm mm$^2$/m) causing high consumption of electric power.

The anthracite used in smelting titanium slags is low in reduction capacity due to its poor reactivity and so is required in large amounts. Anthracite also has a high electric resistance ($\rho = 8000$ ohm.mm$^2$/m), rather high contents of ash (up to 1.7% by mass), high volatiles (up to 9% by mass), high moisture (up to 12% by mass) and high sulfur (up to 1.0% by mass), all of which slow down reduction and otherwise adversely effect smelting (splashing due to a high moisture content), and the resulting product (increased amount of impurities in the resultant product). Finally, the anthracite is a costly reducing agent.

It is therefore an object of the present invention to provide a charge for use in graphitization furnaches, which will make it possible to improve the quality of graphite products.

Another object of the invention is to provide a charge for use in graphitization furnaces, whose production cost is lower than that of any of the known charges.

Still another object of the invention is to provide such a charge which, after being used in the graphitization process, is still suitable for use in ferrous and non-ferrous metallurigical reduction processes, where it possesses a higher reactivity, lower electric resistance and is purer in chemical composition than known reducing agents.

The above and other objects of the invention are attained by providing a charge for use in graphitization furnaces consisting of coke and sawdust, which, in accordance with the invention, consists of 85 to 95 percent by mass of coke comprising not less than 90 percent by volume of size fraction ranging from 0.5 to 2 mm and not more than 10 percent by volume of size fraction ranging from 2 to 10 mm and of 5 to 15 percent by mass of sawdust.

The invention makes it possible to increase the yield of sound products up to 100 percent as against the previously attained 95 percent. The cost of the charge of the invention is 20 percent lower than that of the known charges. In addition, the invention has made possible the use of metallurgical and petroleum cokes of any known contents of ash and volatiles, including cokes previously not used due to high contents of ash and volatiles.

The invention also provides a reducing charge composed of 85 to 95 percent by mass of coke containing not less than 90 percent by volume of a size fraction ranging from 0.5 to 2 mm and not more than 10 percent by volume of a size fraction 2 to 10 mm, and of 5 to 15 percent by mass sawdust, which has been thermally processed at a temperature of not less than 2000° C. in the course of graphitization.

The invention has provide a solution to the problem of economizing on coke, a scarce carbonaceous material by more efficiently using readily available, although previously thought unsuitable, materials. Further economy is attained, according to this invention, by employing the reducing properties of the charge after use in the graphitization furnace in nonferrous and ferrous metal metullurgy. The graphitization charge is highly reactive and reduces by 77.3 percent the consumption of electric power in the manufacture of titanium tetrachloride. In addition, the charge intended as a reducing agent has a low electric resistance ($\rho = 95.5$ to 243 ohm mm$^2$/m), this also providing an economy in the use of electric power. The proposed reducing charge is cheap, since it is substantially a product already spent in the electrode manufacture and requires no special processing. The proposed reducing charge contains, % by mass: volatiles, 0.3 to 1.28; ash, 0.3 to 12.; sulfur, 0 to 0.3; moisture, 0.0 to 3.0.

DESCRIPTION OF THE PREFERRED EMBODIMENTS

These and other objects of the invention will appear from the following description in which the preferred embodiment is set forth in detail in conjunction with the accompanying illustrative Examples.

It is common knowledge that a charge to be used in graphitization furnaces for thermally processing carbon and graphite items must comply with a number of requirements, such as low heat conductivity in order to attain high temperatures in the course of graphitization (above 2500° C.), an adequate porosity in order to remove volatiles and gases and a simplicity of manufacture.

The charge covered by the present invention and consisting of two components, coke and sawdust, is intended for use in graphitization furnaces with a controlled cooling performed with the aid of air ducts in the side walls and the hearth of the furnaces. Because of the air ducts in the furnace, the heat insulating properties of the charge have become of no importance. Thus, the main factor characterizing the quality of the charge is its heat conductivity which depends on the size content of the charge, density of packing, proportion of components and kind of coke. Experiments tend to indicate that a highest quality of carbon and graphite products (practically no defects) have been attained with a heat insulating charge containing 90 percent by volume of coke of size fraction 0.5 to 2 mm. It has been established that the greater the content of the finer size fractions, the better the heat insulating properties of the charge. We propose the use of coke containing not more than 10 percent by volume of size fraction 2 to 10 mm.

Introduction into the charge of sawdust of any species of wood e.g., greenwood, increases the heat insulating properties of the charge. We propose a heat insulating charge which contains from 5 to 15 percent by mass of sawdust. When the content of wood sawdust is below 5 percent by mass, the charge density increases in the course of thermal processing and complete removal of volatiles and ash from graphite items is no longer assured, to the detriment of the quality of the item being produced. The use of a charge with more than 15% by mass of sawdust leads to a greater porosity of the charge resulting in excessive loss of heat in items being processed, also producing poorer quality graphite products.

Metallurgical (foundry and blast furnace) cokes, petroleum cokes obtained in slow coking plants and finer size fractions of other kinds of cokes may be used for preparing heat insulating charges.

The charge is made cheaper by the use of heretofore unusable cokes high in ash and volatiles.

We were the first to discover that the heat-insulating charge used in graphitization furnaces of the proposed chemical composition may be used as a reducing agent in non-ferrous metallurgy, e.g., in the manufacture of titanium, nickel, aluminum and ferroalloys.

Thus, in accordance with the invention, the charge used as a reducing agent is composed of 85 to 95 percent by mass of coke with not less than 90 percent by volume of size fraction 0.5 to 2 mm and not more than 10 percent by volume of size fraction 2 to 10 mm and of 5 to 15 percent by mass of sawdust thermally processed at a temperature of not less than 2000° C.

We have found that at a temperature of not less than 2000° C. the heat insulating charge for graphitization furnaces suffers such changes that make possible its use as a reducing agent.

The present invention reducing agent has an oxidation capacity of 54 percent (which is proof of its high reactivity), a porosity of 48.6 percent, and an electric resistivity of 95.5 to 243 ohm mm$^2$/m.

In addition, the present invention reducing agent is much cheaper than the known ones.

Ash content in the present invention reducing agent is 5 to 6 percent by mass as compared to 30 percent by mass in the known one. A low content of impurities affects favourably the purity of the product.

EXAMPLE 1

Carbon electrodes (350 mm in diameter and 1680 mm long) were graphitized at a temperature of 2500° to 3000° C. in an electric resistance furnace having air ducts for an ejection removal of air and gas. Green electrodes were placed upon a bed of heat insulating charge then covered with a uniform layer of a heat insulating charge composed of pertroleum coke and sawdust taken in proportions of respectively 85 and 15 percent by volume.

The coke and sawdust are mechanically mixed prior to filling, and the resultant charge is fed to the furnace by a grab bucket crane. The chemical composition of coke was the following, in precent by mass:

carbon—72.5
ash—10
volatiles—9.3
moisture—7.0
sulfur—0.6

The size of coke particles is 0.5 2 mm (90% by volume) and 2 to 10 mm (10% by volume); the strength factor, 20.4%; oxidation capacity (affinity for oxygen), 57.7%. Sawdust is in particles 0.5 to 3.0 mm in diameter. Electric resistivity of the charge is 180 kohm mm$^2$/m. The furnace on-time is 42 h, the heating rate at temperatures up to 1000° C. being 100° C./h; from 1000° to 1500° C., 50° C./h; from 1500° to 2500° C., 80° to 120° C./h; above 2500° C. to the final graphitization temperature of 3000° C., 150° C./h.

The pressure inside the furnace in the course of graphitization is 0.5 mm WG. The consumption of electric power is 4200 kW/t. Graphite products are cooled forcedly and after cooling have an electric resistivity of 8 to 11 ohm.mm$^2$/m, a surface free of cracks, carbide inclusions and burnt areas.

The yield of sound products is 100%.

The heat insulating charge after it is discharged from the furnace runs 0.5% ash, 0.8% volatiles and 98.7% carbon, and is usable as such as a reducing agent in nonferrous metallurgy.

EXAMPLE 2 (Comparative)

Green electrodes as described in Example 1 were graphitized with the use of a charge contaning 80% by volume of coke and 20% by volume of sawdust (according to a prototype), the results being:

porosity of electrodes—up to 20%,
electric resistivity—12 to 20 ohm mm$^2$/m,
yield of sound electrodes—80 to 90%.

EXAMPLE 3

Items were graphitized as described in Example 1 with the use of a heat insulating charge, % by volume:
coke—90
sawdust—10

The yield of sound products was 100 %, and the electric resistivity and the porosity of the charge were respectively 8 to 10 ohm.mm$^2$/m and 8 to 10%.

EXAMPLE 4

Items were graphitized as described in Example 1 with the use of a heat insulating charge composed of % by volume:
coke—95
sawdust—5

The yield of sound products was 100%, and the electric resistivity and the porosity of the charge are respectively 10 to 11 ohm.mm$^2$/m and 10 to 12%.

It is readily apparent from the above examples that the proposed charge yields sound graphite items of a lower porosity and electric resistivity as compared to the known charge (according to the prototype). In addition, the cost of the proposed charge (when high-ash cokes are used) is one half that of the known charge.

EXAMPLE 5 (reducing properties)

66.8% by mass of fine titanium slag with 90% by mass size fraction 0.1 mm were mixed with 19.2% by mass of thermally processed in graphitization furnaces, heat insulating charge of Example 1 containing not less than 80% by mass of size fraction less than 0.15 mm. Next, 9% by mass of medium-temperature pitch and 5% by mass of sulfite cellulose liquor were added to the mixture which was briquetted, and the briquettes were coked for 15 hours. Resultant briquettes were highly strong (300 kgf/cm$^2$) and reactive. In the chloridizing, the yield of titanium tetrachloride was 93.8%, and the fall of calcine was lower by 20% (from 90 to 70 kg per ton of titanium tetrachloride).

Example 6

Ground to size fraction indicated in the Example 1, titanium slag and a thermally processed heat insulating charge were mixed in a balling drum with the use of sulfite cellulose liquor in the following proportions, parts by mass: 60 to 65 slag, 20 to 25 said charge and 8 liquor, until pellets were obtained. The latter were coked in pittype furnaces for 10 hours.

The strength of pellets meets the requirements of the chloridizing process and averages 133.6 kg/pellet, whereas the oxidation capacity of the pelletized reducing agent was 42.5%. The yield of titanium tetrachloride was 94.2%, and the fall of calcine had been decreased by 25%.

EXAMPLE 7

Ground to a size fraction specified in the Example 5, 78.3% of titanium slag and 21.7% of thermally processed charge were mixed in a balling drum. The mixture was then chloridized in a salt bath composed of 80% KCl, 10% NaCl, 5% MgCl$_2$ and 4% CaCl$_2$ and maintained at a temperature of 820° C. The charge and chlorine were introduced into the body of the bath through an air duct. Chloridizing was carried out without frothing the melt. The recovery of titanium was 95.3%.

The advantages of the proposed reducing agent are as follows:

1. A fairly high oxidation capacity (reactivity) of the reducing agent amounting to about 60% and the introduction of up to 15% of charcoal lowers, appreciably the specific consumption of the reducing agent.
2. Small (having no practical effect upon chloridizing) contents of volatiles, ash, moisture and, sulfur improve the quality of titanium tetrachloride and lowers the specific consumption of chlorine and of various kinds of energy (natural gas, air, steam, water, electric power).
3. The premixed dry reducing agent (minus binders) is usable for chloridizing in a fluid-bed, in molten salts and in a fixed coke packing.
4. A sharp drop in the cost of charge preparation due to the elimination of special equipment for drying and calcination and the use of such reducing agents as cheap cokes high in ash, volatiles and moisture contents which are processed by waste heat from the graphitization process.

What is claimed is:
1. A charge for use in graphitization furnaces, composed of 85 to 95 percent by mass of: coke with not less than 90 percent by volume of size fraction 0.5 to 2 mm and not more than 10 percent by volume of size fraction 2 to 10 mm; and of 5 to 15 percent by mass of sawdust.
2. A charge having reducing properties and composed of 85 to 95 percent by mass of: coke with not less than 90 percent by volume of size fraction 0.5 to 2 mm and not more than 10 percent by volume of size fraction 2 to 10 mm; and of 5 to 15 percent by mass of sawdust, thermally processed at a temperature of not less than 2000° C. in the course of graphitization.

* * * * *